Feb. 10, 1959  R. K. BOYER  2,872,963
VALVE STEM FOR TUBELESS TIRES
Filed Dec. 4, 1953

INVENTOR.
RALPH K. BOYER
BY Hudson, Boughton,
Williams, David & Hoffmann
ATTORNEYS

United States Patent Office 2,872,963
Patented Feb. 10, 1959

2,872,963

VALVE STEM FOR TUBELESS TIRES

Ralph K. Boyer, Cleveland, Ohio, assignor to The Dill Manufacturing Company, Cleveland, Ohio, a corporation of Ohio Application December 4, 1953, Serial No. 396,220

1 Claim. (Cl. 152—427)

It is the purpose of the present invention to provide a valve stem which is particularly adapted for use with a tubeless tire wherein the tire is mounted upon a rim and no inner tube is employed.

In employing the tubeless tire construction the casing is mounted upon a rim of essentially standard construction and upon the inner portion of the rim there is provided an opening for the reception of a valve stem adapted to hold a valve insides commercially available.

It is the purpose of the present invention to provide a valve stem which may be secured in the valve stem opening provided in the rim after the tubeless tire has been mounted on the rim, by inserting the stem from the outside of the rim through the before mentioned opening and providing means for securing the valve stem in the rim hole, thus obviating what would otherwise be necessary, that is demounting the tire from the rim so that a stem could be inserted from the inside of the rim.

The ability to insert a stem into the opening in a rim, from the outside of the rim without the necessity of demounting the tire casing, is important particularly in connection with the replacement of a valve stem which may have become damaged or is necessary to be removed for any other reason. This is plainly demonstrated when the tubeless tire is of large size such as used in tractors, earth moving machines or vehicles of like character.

Reference should be had to the accompanying drawing illustrating an embodiment of the invention and forming a part of this specification and in which, Fig. 1 is an elevation with portions in section of the novel valve stem and showing the same secured to a rim which is partially indicated;

Tubeless tires have gone into such extensive use as to have become thoroughly established in the trade and not only is the tubeless tire used in connection with vehicle tires of the smaller size such as used upon automobiles, but it has gone into use in connection with tires for use with larger, heavier types of vehicles, such as tractors and other machines or apparatus which are comparable in size and weight.

Referring particularly to the heavier and larger size of tires it is, of course, well-known that they are heavy and the operation of mounting or demounting the same from a rim is an operation which might be described as a major operation. It will be quite apparent that a valve stem so constructed that it can be applied to the valve stem hole in the rim, from the outside of the rim and thus avoid the necessity of removing the tire casing so as to gain access to the inner part of the rim, is certainly of value.

Figure 2:
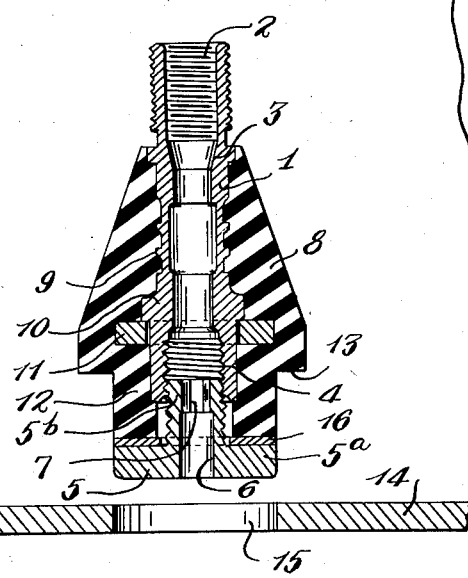
Fig. 2 is a sectional elevation which shows the valve stem in position to be inserted in the opening of a rim which is partially shown.

Referring more particularly to Fig. 2 of the drawing the valve structure provides a hollow body which is indicated at 1. This body at its outer end is provided with internal screw threads 2 and a slanting shoulder 3, which is for the purpose of receiving a valve core or valve insides of a construction well-known in the art. The body, at its outer end, is provided with an external threaded portion to receive a valve stem cap, such as known in the art.

At its lower end the body 1 is provided with a threaded recess 4, and adapted to engage with such recess is a head member 5 which is provided with a flange 5ᵃ and a threaded shank or extension 5ᵇ and having a central opening 6, and the upper part of this opening is formed to be multisided as indicated at 7, for the reception of the head of a wrench which will later be described.

Mounted upon the outside of the hollow body 1 is a rubber body 8, which, in the present instance, is formed in a conical shape, and for the purpose of securing adherence of the rubber body to the hollow body 1 when bonded thereto, the last-mentioned body is provided with ribs 9, a head 10, against which a washer 11 impinges and which washer surrounds the lower part of the body 1. The rubber body 8 is provided with a cylindrical extension 12 projecting longitudinally from an enlarged diameter portion of the body thus providing a shoulder 13 upon the lower portion of the rubber body 8. The extension 12 is of a diameter that will fit in the usual valve stem hole of a vehicle rim, the diameter of which opening has become standardized in the trade. In the drawing a portion of a rim is indicated at 14 and the valve stem opening is indicated at 15.

Between the head member 5 and the lower end of the extension 12 of the rubber body 8 a washer 16 is positioned so that the head 5 will bear against the washer in the subsequent use of the stem.

Figure 1:
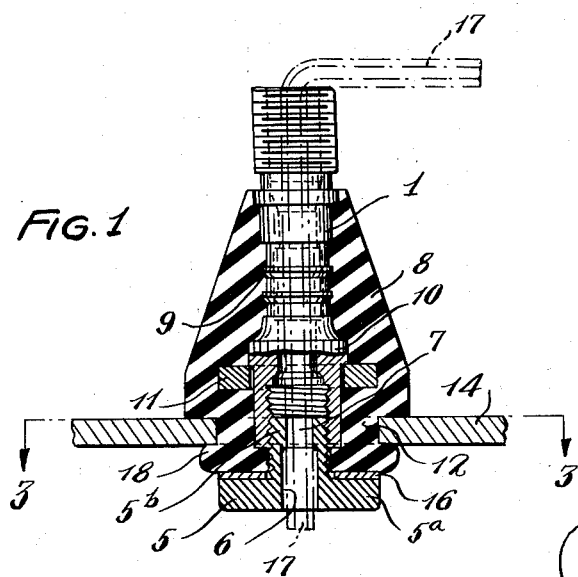
Figure 4:
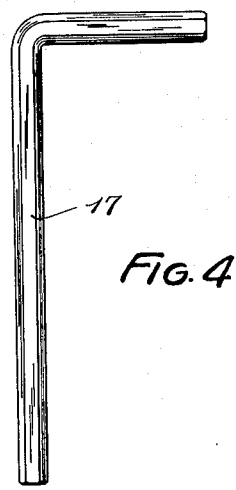
Fig. 4 is an elevation of an Allen type socket wrench used in application of the valve stem to a rim.
Figure 3:
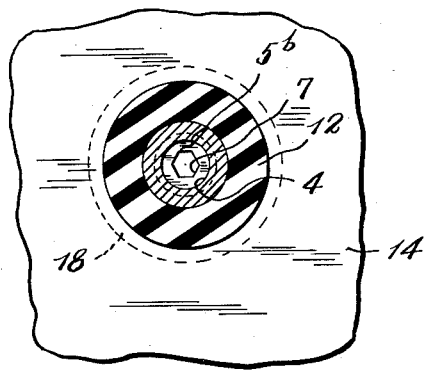
Fig. 3 is a plan section taken on line 3—3 of Fig. 1 looking downward in the direction of the arrows.

Inspection of Fig. 2 will show the condition of the stem prior to its insertion and fastening in the tire rim. In proceeding with the mounting of the valve stem as a unit on the rim, the extension 12 of the rubber body is inserted through the valve stem rim opening 15 since the diameter of the flange 5 and of the extension 12 are such that they can move into and through the said valve stem opening. When thus inserted the ledge 13 upon the body member 8 will come against that portion of the rim adjacent the periphery of the opening therein and will bear upon the rim. A wrench which is indicated at 17 in Fig. 1, and Fig. 4 has a long shank with a multisided head, is introduced through the hollow stem 1 so that its multisided head will fit into the multisided opening 7 which is associated with the extension 5ᵃ of the member 5. Rotation of the wrench 17 will cause the threaded portion of the member 5 to move up into the threaded portion 4 of the member 1 and in so doing the rubber in the extension 12 will be laterally expanded into binding contact with the wall of the opening in the rim 14. The vertical compression of the rubber will, at least to some extent, cause the lower portion of the extension 12 to bulge outwardly, as indicated at 18 in Fig. 1, and the holding effect of the compressed rubber is such as to firmly anchor the valve stem in the valve stem opening of a rim.

It will be obvious that this valve stem may be removed by the use of the wrench 17 in a manner reversed by that of its former use to secure the stem in the valve stem opening.

Having thus described my invention, I claim:

A valve stem for tubeless tires which as a unit can be mounted in or removed from the standard size rim opening of a tubeless tire when a tubeless tire is mounted on the rim and comprising a rigid insert having a bore extending from one end of the insert and shaped and threaded to receive a valve insides or core and communicating adjacent the opposite end of the insert with a threaded counterbore therein, a rubber body surrounding said insert and extending from adjacent said one end thereof toward said opposite end thereof and bonded thereto, said body having an enlarged diameter portion of a diameter greater than the diameter of the rim opening and an integral cylindrical extension projecting longitudinally from said enlarged portion and bonded to said insert at said opposite end thereof and projecting beyond said opposite end and of a diameter interfitting and passable through the rim opening, and a securing member having a head engageable with the free end of said cylindrical extension of the body and substantially of the same diameter as that of said extension, said member having a tubular externally threaded portion screwing into said threaded counterbore in said insert, said cylindrical extension of said body being spaced radially outwardly of said externally threaded tubular portion of said member prior to the installation of said valve stem as a unit in the rim opening, said member being provided with wrench surface means cooperating with similar means on a tool insertable in said insert and rotatable to rotate said member relative to said insert whereby said valve stem can be secured to said rim as a unit when a tire is mounted on the rim by passing said cylindrical extension of said body through the rim opening until the outside of the rim is engaged by the enlarged portion of said body and then turning the tool extending through the insert to rotate said securing member and cause said head to exert a longitudinal pressure on the free end of said cylindrical extension of the body to compress the same longitudinally and expand it diametrally beyond its normal diameter and into engagement with the inner side of the rim within the tire and with said tubular portion of said member.

References Cited in the file of this patent
UNITED STATES PATENTS

| | | |
|---|---|---|
| 1,755,104 | Deierlein | Apr. 15, 1930 |
| 2,277,885 | Rodanet | Mar. 31, 1942 |
| 2,481,142 | Mueller | Sept. 6, 1949 |
| 2,482,469 | Crowley | Sept. 20, 1949 |
| 2,744,559 | Leonetti | May 8, 1956 |